United States Patent [19]

Piazza et al.

[11] 3,851,897

[45] Dec. 3, 1974

[54] WELL CONNECTOR

[75] Inventors: Andre L. Piazza, Houston; Ado N. Vujasinovic, Humble, both of Tex.

[73] Assignee: The Rucker Company, Houston, Tex.

[22] Filed: May 24, 1973

[21] Appl. No.: 363,344

[52] U.S. Cl. ............ 285/18, 285/315, 285/DIG. 21
[51] Int. Cl. ............................................. F16l 35/00
[58] Field of Search ......... 285/18, 24, 27, 141, 315, 285/DIG. 21; 166/0–6

[56] References Cited
UNITED STATES PATENTS

| | | | |
|---|---|---|---|
| 3,099,317 | 7/1963 | Todd | 285/DIG. 21 |
| 3,321,217 | 5/1967 | Ahlstone | 285/18 |
| 3,675,713 | 7/1972 | Watkins | 285/18 |

*Primary Examiner*—Dave W. Arola
*Attorney, Agent, or Firm*—Jefferson D. Giller; James F. Weiler; William A. Stout

[57] ABSTRACT

A well connector for connecting adjacent sections of a well drilling system together. A secondary release system is provided having a secondary piston and port for moving the primary release system to a release position in the event of a failure in the primary system actuating circuit. The secondary system includes the movable sleeve for closing a fluid port of the primary system and opening the port of the secondary release system for actuating the secondary release releasing the connection. A lifting assembly for hydraulically jacking up and separating one of the sections relative to the other section to overcome any binding between the two sections. The lifting assembly includes a lifting piston and cylinder. Control means are provided allowing actuation of the lifting piston and cylinder only when the connecting and disconnecting assembly has moved to a position disconnecting the adjacent sections, and also allowing the connecting and disconnecting assembly to move to a position to connect the adjacent sections only when the lifting piston and cylinder have been retracted.

9 Claims, 1 Drawing Figure

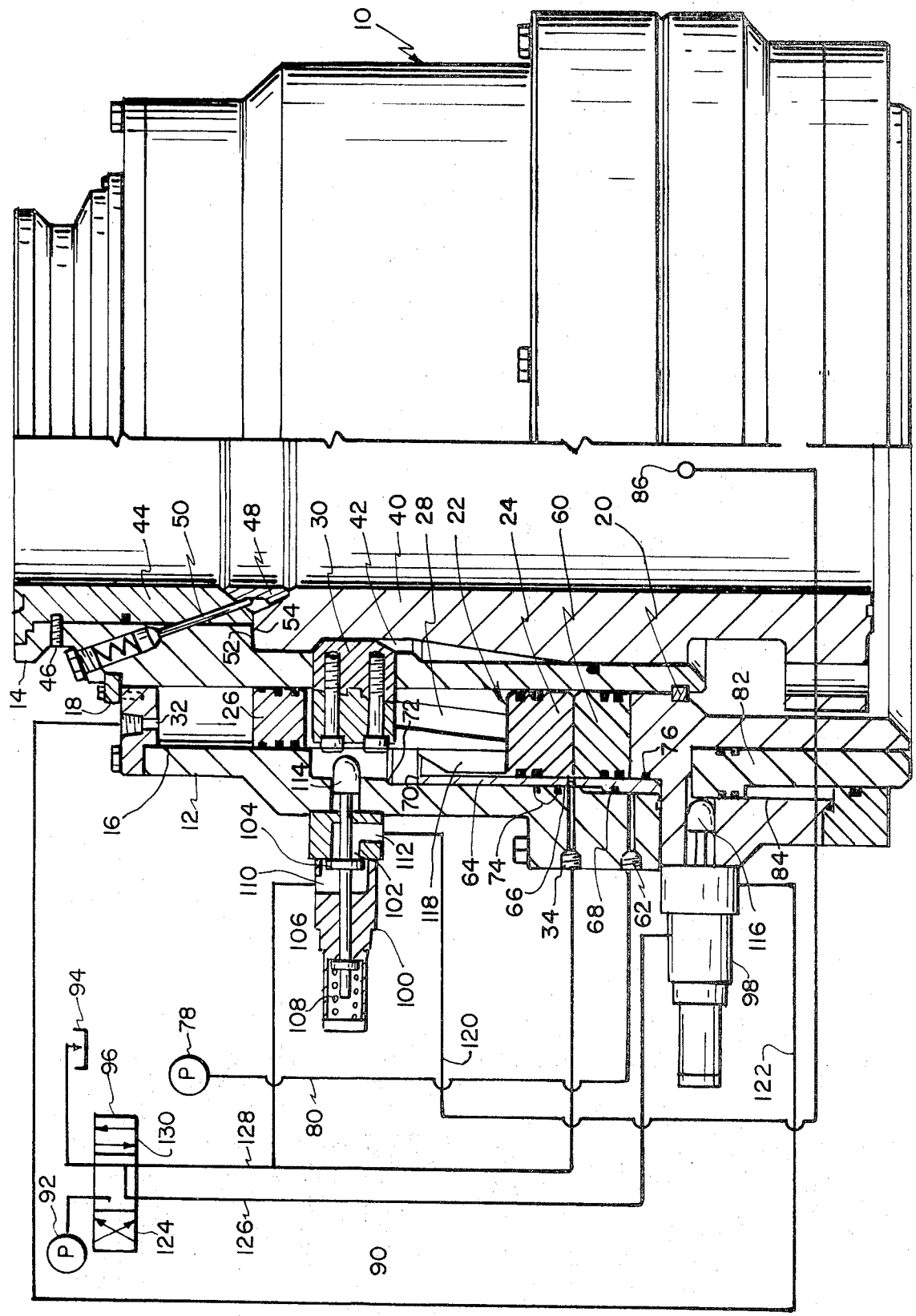

WELL CONNECTOR

BACKGROUND OF THE INVENTION

It is old to provide a connector such as the type E70 of the Rucker-Shaffer Company as shown on pages 3914 and 3915 of their catalog of a connector for connecting and disconnecting two sections of a drilling system such as the riser section to the blowout control and prevention section, a blow-out control and prevention section to a wellhead section, or other adjacent sections of the drilling system. One of the sections includes a locking recess or notch and the second section includes a double acting piston connected to and moving locking lugs into and out of the locking notch on reciprocal movement in a cylinder. A first fluid port admits fluid into the cylinder to move the piston in a direction to connect the sections, and a second port admits fluid to move the piston in a direction disconnecting the sections.

The present invention is directed to various improvements in such a connector by providing a secondary release or disconnect system for disconnecting the sections in the event of a malfunction of the primary system.

Another feature is the provision of a lifting mechanism to hydraulically jack up and separate one section from the other section in the event of unusual binding between the two sections so that they can be more easily separated.

Still another feature is the mechanical triggering for fail safe and sequential operation of the diverse functions.

SUMMARY

One of the features of the present invention is the provision of a secondary disconnect system for disconnecting two sections of a well connector having a double acting piston for moving locking lugs into and out of connection between two sections by providing a secondary disconnect piston for moving the double acting piston in the event of a malfunction of the primary release system. The secondary disconnecting piston is positioned on a side of the disconnecting fluid port opposite the double acting piston, and a third fluid port is provided positioned behind the secondary piston for admitting fluid for moving the secondary piston which in turn moves the double acting piston in a direction for disconnecting the sections.

The secondary disconnect system includes a movable sleeve including an opening normally in communication between the primary disconnecting port and the primary piston. Piston means are connected to the sleeve and in communication with the primary release port for moving the sleeve so that the sleeve opening is normally aligned with the primary release port. The piston means is also in communication with the secondary disconnect fluid port for moving the sleeve and closing the primary release port prior to actuation of the secondary disconnect piston.

Yet a further object of the present invention is the provision of a lifting piston assembly connected to one of the well sections for lifting one section relative to the other section for aiding in separating the two sections. Control means are provided for allowing actuation of the lifting piston cylinder only when the release system has moved to a position disconnecting the two well sections and also allowing the primary piston to move to a position connecting the first and second sections only when the lifting piston and cylinder have been retracted.

A still further object is the provision wherein the control means includes a first normally closed valve controlling the fluid port for connecting the first and second sections in which the first valve is positioned to be engaged by the lifting assembly and actuated to an open position when the lifting assembly is retracted. A second normally closed valve is provided controlling the fluid to the lifting assembly with the second valve positioned to be engaged by the primary piston and actuated to an open position when the primary piston moves to a disconnect position.

Still a further object of the present invention is the provision of a lifting piston and cylinder which are annular in shape for providing a uniform lifting force for separating the two well string sections.

Other and further objects, features and advantages will be apparent from the following description of a presently preferred embodiment of the invention, given for the purpose of disclosure and taken in conjunction with the accompanying drawing.

BRIEF DESCRIPTION OF THE DRAWING

The Drawing is an elevational view, partly in cross section, of the invention of the present invention including a schematic of the control means.

DESCRIPTION OF THE PREFERRED EMBODIMENT

Referring now to the drawing, the reference numeral 10 generally indicates the well connector of the present invention for connecting adjacent sections of a drilling system together. A first section 12 generally includes a body 14, and a cylinder housing 16 connected to the body 14 such as by top ring 18 and bottom ring 20. In the cylinder 16 is provided a double acting piston generally indicated by the reference numeral 22 having a first head 24 and a second head 26 and a tapering linkage 28 therebetween for actuating one or more loading lugs 30 inwardly and outwardly by coaction with the tapering linakge 28. A first port 32 is provided in the cylinder 16 for admitting fluid to move the piston head 26 and piston 22 downwardly and in a direction to move the locking lug 30 inwardly and into a locking position. A second or releasing port 34 is provided in the cylinder 16 for admitting fluid to move the piston head 24 and piston 22 in a direction so that the tapered linkage 28 retracts the locking lug 30. The section 12 may also include a seal insert 44 connected to the body 14 by a screw 46 and a main seal ring 48 retained by a lock pin 50.

The second section of the well tubing to be connected to the first section 12 may be section 40 having a locking notch or recess 42 for coacting with the locking lugs 30 for retaining the sections 12 and 40 longitudinally together.

In operation, the one section 40 is fastened to a lower section of the drilling system such as by a clamp or a flange and the section 12 is connected to the upper section of a drilling system in the same manner. Of course, the sections 12 and 40 may be reversed. Fluid pressure is applied to the port 32 moving the double acting piston 22 upwardly venting fluid out of the port 32. The piston 22 travels upwardly and the locking lugs 30 which ride on the tapered linkage 28 are retracted placing the lugs 30 in the unlatched or disconnected position. The section 12 is then lowered over the section 40 until shoulder 52 engages shoulder 54 and the body 12 rests on the body 40. Simultaneously, the seal ring 48 is compressed between the seal insert 44 and the section 40. Fluid pressure is then applied to port 32 and vented out of port 34 causing the double acting piston 22 to travel downwardly moving the locking lugs 30 inwardly and into the recess 42 on the body 40 connecting the sections 12 and 40 together. The above description of the well connector 10 is conventional of the model E70 connector of Rucker-Shaffer.

When it is desired to unlatch or disconnect the sections 12 and 40 from each other, fluid again is applied through port 34 against the backside of the piston head 24 to retract the locking lugs 30 allowing the section 12 to be raised from the well section 40. However, the well connector 10 is frequently used in subsea marine applications and it would be useful to have a secondary release or disconnect system in the event of a malfunction of the primary system.

One of the features of the present invention is the provision of a secondary disconnect system with the same characteristics of power for use with the above described well connector in which a secondary disconnecting piston 60 is provided positioned in the cylinder 16 on a side of the port 34 opposite the head 24 of the double acting piston 22. Admission of fluid into the releasing port 34, while acting against the head 24 moving piston 22 into a disconnect position also acts on the secondary piston 60 to retain the piston 60 in its normal position. In addition, a third fluid port 62 is provided leading into the cylinder 16 behind the secondary piston 60 for moving the secondary piston 60 which in turn contacts and moves the double acting piston 22 in a direction for retracting the locking lugs 30 and disconnecting the sections 12 and 40. Preferably, a movable sleeve 64 is provided in the cylinder 16 having an opening 66 normally in register with the port 34 for allowing fluid passage between the interior of the cylinder 16 and the port 34. A suitable piston 68 is formed on the sleeve 64 whereby the action of hydraulic fluid through the port 34 holds the sleeve 64 downwardly to its extent of travel keeping the opening 66 aligned with the port 34.

In the event that the primary disconnect system fails, pressure is then applied through port 62 acting on piston 68 of the sleeve 64 causing the sleeve 64 to move upwardly until its upper end 70 contacts shoulder 72 moving the opening 66 out of communication with the port 34 and into position between seals 74. In the upper position of the sleeve 64, the port 34 is now closed from communication with the interior of the cylinder 16.

In addition, seal 76 is provided to insure that the sleeve 64 will move upwardly closing the port 34 prior to the actuation of the secondary piston 60 by fluid passing inwardly through the port 62. With the sleeve 64 in the upper position, suitable hydraulic fluid may be pumped by a pump 78 through a line 80 to the port 62 acting against the backside of the secondary piston 60 and in turn moving the double acting piston 22 upwardly for disconnecting the locking lugs 30 from the notch 42.

However, after extended periods of use, the sections 12 and 40 may be difficult to separate even with the locking lugs 30 retracted from the notch 42 or the sections may have a problem of unusual binding between them such as might be caused by excessive deflection in one of the well string sections 12 and 14.

Another feature of the present invention is the provision of a hydraulic jack up or lifting assembly for lifting one of the sections relative to the other section for aiding in separating the sections 12 and 40. The lifting assembly includes a piston 82 movable in a cylinder 84 in which one of the members, such as the piston 82, is adapted to abut a portion of the lower section of the drilling system so that when fluid is admitted to ports 86 and moves the piston 82 in the cylinder 84, the section 12 will be hydraulically jacked up and separated from section 40. In addition, by controlling the fluid return from the ports 86, the piston 82 will automatically provide a cushion against shocks when the section 12 is lowered and installed on the section 40.

However, since it is not desirable to jack up the section 12 relative to the section 40 before the locking lugs 30 are retracted from the notch 42, suitable control means are provided which allow actuation or extension of the lifting piston and cylinder 82 and 84 only when the piston 22 has moved to a position retracting the locking lugs 40 and disconnecting the sections 12 and 40. Furthermore, the locking lugs 30 should not be moved into engagement with the body 40 before the lifting piston and cylinder 82 and 84 are retracted or otherwise the lugs 30 may not be aligned with the locking notch 42 for properly connecting the sections 14 and 40 together. Therefore, the control means also allows the piston 22 to move to a position to extend the locking lugs 30 inwardly and connect the first and second sections 12 and 40 together only when the lifting piston 82 and cylinder 84 have been retracted.

The control system generally indicated by the reference numeral 90 includes a pump 92, return sump 94 and control valve 96.

In addition, the control system 90 includes a first normally closed valve 98 for controlling the fluid to the port 32, and a second normally closed valve 100 for controlling fluid to the ports 86 and to the lifting assembly.

The valves 98 and 100 are identical and referring to valve 100, the valves include a valve seat 102 and valve element 104 which is connected to a valve stem 106. The stem 106 is biased by a spring 108 for normally moving the valve element 104 onto the seat 102 closing the communication between the inlet port 110 and the outlet port 112.

Valve 100 includes a stem extension 114 connected to stem 106 and extending into the cylinder 16. Valve 98 includes a stem extension 116 normally extending into the cylinder 84 of the lifting assembly.

Piston 22 includes an engaging shoulder 118 whereby when the piston 22 is in the upward or disconnect position the shoulder 118 will engage stem extension 114 pushing it outwardly and moving the valve element 104 away from the valve seat 102 allowing hydraulic fluid to flow through the line 120 and to the port 86 to actuate the lifting piston 82 and 84. However, it is to be noted that unless the piston 22 is in the upward position retracting the locking lugs 30, the valve 100 will be closed to insure that the lifting piston 82 and cylinder 84 assembly cannot be actuated.

Similarly, when the piston 82 is in the retracted position in the cylinder 84, the piston 82 engages the stem extension 116 of the valve 98 opening the valve 98 allowing fluid to flow to line 122 and into the port 32 for moving the piston 22 into a locking position. However, the piston 22 cannot be moved to the locking position until the lifting piston 82 is in the retracted position.

In operation, when the valve 96 is moved so that valve position 124 is in communication with the lines 126 and 128, fluid is supplied to the valve 100 as well as to the port 34. Since the stem extension is in its extended position fluid will not pass through valve 100 until fluid passing through the port 34 raises the piston 22 to disconnect the locking lugs 30, and thereafter contact extension 114 to open the valve 100 allowing the lifting assembly 82 and 84 to be actuated.

And when the control valve 96 is moved to place valve position 130 in communication with the lines 126 and 128, the valve 98 will not pass fluid to the port 32 for locking the members 12 and 40 together unless the lifting piston and cylinder 84 are retracted.

The present invention, therefore, is well adapted to carry out the objects and attain the ends and advantages mentioned as well as others inherent therein. While a presently preferred embodiment of the invention has been given for the purpose of disclosure, numerous changes in the detail of construction and arrangement of parts may be provided, without departing from the spirit of the invention and the scope of the appended claims.

What is claimed is:

1. In a connector for connecting and disconnecting two sections of a drilling system in which one section includes a locking notch and the second section includes a double acting piston having sealing means and connected to and moving a locking lug into and out of said locking notch on reciprocal movement in a cylinder having a first port on one side of the piston for admitting fluid to move the piston in a direction to connect the sections and a second port on the second side of the piston for admitting fluid to move the piston in a direction disconnecting the sections, the improvement of a secondary disconnect system comprising,
   a secondary disconnecting piston having sealing means and positioned in said cylinder on a side of the second port opposite the double acting piston, and
   a third port in the cylinder positioned behind the secondary piston for admitting fluid for moving the secondary piston and the double acting piston in a direction for disconnecting the sections.

2. The apparatus of claim 1 including,
   a movable sleeve in said cylinder, said sleeve including an opening normally in communication between the second port and the cylinder,
   means for moving said sleeve and closing communication between the second port and the cylinder.

3. The apparatus of claim 1 including,
   a movable sleeve in said cylinder including an opening,
   piston means connected to the sleeve in communication with the second port whereby pressure against the piston moves the sleeve for aligning the sleeve opening with the second port,
   said piston means in communication with the third port whereby fluid pressure from the third port will move the sleeve and the sleeve opening out of communication with the second port.

4. The apparatus of claim 3 including,
   seal means between the double acting piston and the third port for sealing with the sleeve piston for insuring that the sleeve is actuated by fluid from the third port prior to the movement of the secondary disconnect piston.

5. The apparatus of claim 1 including,
   a lifting piston and cylinder connected to the second section for lifting the second section relative to the first section for aiding in separating the first and second sections.

6. The apparatus of claim 5 including,
   control means allowing actuation of the lifting piston and cylinder only when the double acting piston has moved to a position disconnecting the first and second sections, and allowing the double acting piston to move to a position to connect the first and second sections only when the lifting piston and cylinder have been retracted.

7. In a connector for connecting and disconnecting two sections of drilling system in which one section includes a locking notch and the second section includes a double acting piston connected to and moving a locking lug into and out of said locking notch on reciprocal movement in a cylinder having a first port for admitting fluid to move the piston in a direction to connect the sections and a second port on the second side of the piston for admitting fluid to move the piston in a direction disconnecting the sections, the improvement of a lifting assembly for lifting the second section relative to the first section for aiding in separating the first and second sections comprising,
   an annular ring-shaped lifting piston and cylinder means having sealing means therebetween connected to the second section and extending therearound for lifting the second section relative to the first section.

8. The apparatus of claim 7 including,
   control means including valve means interconnected between the lifting piston and cylinder and the double acting piston and it coacting cylinder for allowing actuation of the lifting piston and cylinder only when the double acting piston has moved to a position disconnecting the first and second sections, and allowing the double acting piston to move to a position to connect the first and second sections only when the lifting piston and cylinder have been retracted.

9. The apparatus of claim 8 wherein the control means includes,
   a first normally closed valve controlling the fluid to the first port, said first valve positioned to be engaged by the lifting assembly and actuated to an open position when the lifting assembly is retracted, and
   a second normally closed valve controlling the fluid to the lifting assembly, said second valve positioned to be engaged by the double acting piston and actuated to an open position when double acting piston moves to a disconnect position.

* * * * *